(12) United States Patent
Asanuma et al.

(10) Patent No.: US 9,707,543 B2
(45) Date of Patent: Jul. 18, 2017

(54) EXHAUST-GAS-PURIFICATION CATALYST CARRIER

(71) Applicant: Mitsui Mining & Smelting Co., Ltd., Tokyo (JP)

(72) Inventors: Takahito Asanuma, Ageo (JP); Yasuhide Yamaguchi, Ageo (JP); Yunosuke Nakahara, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 14/427,491

(22) PCT Filed: Aug. 22, 2013

(86) PCT No.: PCT/JP2013/072414
§ 371 (c)(1),
(2) Date: Mar. 11, 2015

(87) PCT Pub. No.: WO2014/041984
PCT Pub. Date: Mar. 20, 2014

(65) Prior Publication Data
US 2015/0209760 A1    Jul. 30, 2015

(30) Foreign Application Priority Data
Sep. 14, 2012  (JP) ................. 2012-202625

(51) Int. Cl.
| | | |
|---|---|---|
| *B01J 23/63* | (2006.01) | |
| *B01J 37/03* | (2006.01) | |
| *B01J 37/18* | (2006.01) | |
| *B01J 23/10* | (2006.01) | |
| *B01J 35/00* | (2006.01) | |
| *B01J 35/02* | (2006.01) | |
| *B01J 35/10* | (2006.01) | |
| *B01J 37/02* | (2006.01) | |
| *B01J 37/08* | (2006.01) | |
| *B01J 21/06* | (2006.01) | |
| *B01J 23/00* | (2006.01) | |
| *B01D 53/94* | (2006.01) | |
| *B01J 23/44* | (2006.01) | |

(52) U.S. Cl.
CPC ............ *B01J 23/63* (2013.01); *B01D 53/945* (2013.01); *B01J 21/066* (2013.01); *B01J 23/002* (2013.01); *B01J 23/10* (2013.01); *B01J 23/44* (2013.01); *B01J 35/002* (2013.01); *B01J 35/0006* (2013.01); *B01J 35/02* (2013.01); *B01J 35/023* (2013.01); *B01J 35/1009* (2013.01); *B01J 35/1014* (2013.01); *B01J 35/1061* (2013.01); *B01J 35/1066* (2013.01); *B01J 37/0201* (2013.01); *B01J 37/0248* (2013.01); *B01J 37/03* (2013.01); *B01J 37/08* (2013.01); *B01J 37/18* (2013.01); *B01D 2255/1023* (2013.01); *B01D 2255/407* (2013.01); *B01D 2255/908* (2013.01); *B01D 2255/9205* (2013.01); *B01D 2255/9207* (2013.01); *Y02T 10/22* (2013.01)

(58) Field of Classification Search
CPC ........ B01J 23/63; B01J 21/066; B01J 23/002; B01J 23/10; B01J 23/44; B01J 35/0006; B01J 35/002; B01J 35/02; B01J 35/023; B01J 35/1009; B01J 35/1014; B01J 35/1061; B01J 35/1066; B01J 37/0201; B01J 37/0248; B01J 37/03; B01J 37/08; B01J 37/18; B01D 53/945
See application file for complete search history.

(56) References Cited

U.S. PATENT DOCUMENTS

| | | | | |
|---|---|---|---|---|
| 5,908,800 | A * | 6/1999 | Bonneau | .................. B01J 23/10 423/263 |
| 2006/0018822 | A1 | 1/2006 | Okamoto | |
| 2008/0050593 | A1 | 2/2008 | Okamoto | |
| 2008/0312075 | A1 | 12/2008 | Okamoto | |
| 2011/0113754 | A1 * | 5/2011 | Kohara | ................ B01D 53/945 60/274 |
| 2011/0274603 | A1 | 11/2011 | Kohara et al. | |

FOREIGN PATENT DOCUMENTS

| | | |
|---|---|---|
| JP | 11-165067 | 6/1999 |
| JP | 2003-246624 | 9/2003 |
| JP | 2005-170774 | 6/2005 |
| JP | 2006-36576 A | 2/2006 |
| JP | 2008-81392 A | 4/2008 |
| JP | 2009-084061 | 4/2009 |
| JP | 2012-110859 | 6/2012 |
| WO | 2008/093471 A1 | 8/2008 |
| WO | 2010103870 A | 9/2010 |

OTHER PUBLICATIONS

Zimicz, M.G., et al., "Effect of synthesis conditions on the nanopowder properties of Ce0.9Zr0.1O2", Materials Research Bulletin, pp. 850-857, vol. 46, 2011.

* cited by examiner

*Primary Examiner* — Melvin C Mayes
*Assistant Examiner* — Michael Forrest
(74) *Attorney, Agent, or Firm* — The Webb Law Firm

(57) ABSTRACT

Provided is an exhaust-gas-purification catalyst carrier that contains a ceria-zirconia complex oxide having a pyrochlore phase and a novel exhaust-gas-purification catalyst carrier that exhibit excellent OSC performance at any temperature region of a low temperature (around 400° C.) and a high temperature (around 800° C.). Proposed is the exhaust-gas-purification catalyst carrier containing a ceria-zirconia complex oxide which has a pyrochlore phase and is 7.0 m$^2$/g or more in specific surface area and in the range of 100 Å to 700 Å in crystallite size.

7 Claims, 1 Drawing Sheet

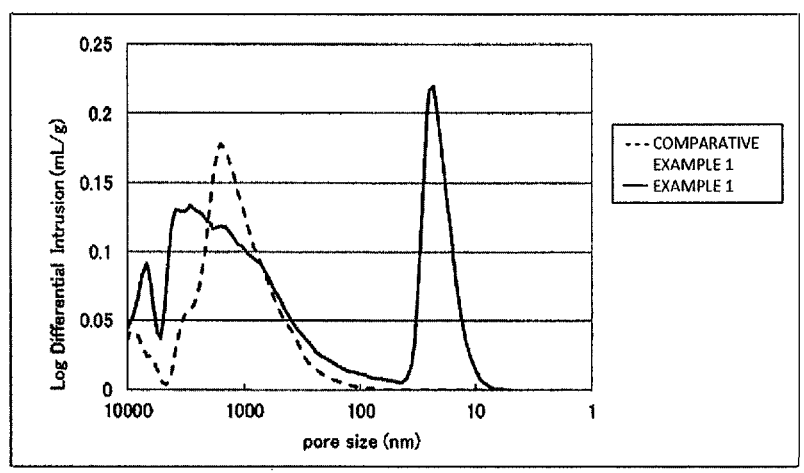

EXHAUST-GAS-PURIFICATION CATALYST CARRIER

CROSS-REFERENCE TO RELATED APPLICATIONS

This application is the United States national phase of International Application No. PCT/JP2013/072414 filed Aug. 22, 2013, and claims priority to Japanese Patent Application No. 2012-202625 filed Sep. 14, 2012, the disclosures of which are hereby incorporated in their entirety by reference.

TECHNICAL FIELD

The present invention relates to an exhaust-gas-purification catalyst carrier which can be used for purifying an exhaust gas to be emitted from an internal combustion engine such as two-wheel or four-wheel automobiles and, more particularly, to an exhaust-gas-purification catalyst carrier having an oxygen storage.

BACKGROUND ART

Since an exhaust gas of the internal combustion engine such as an automobile which use gasoline for fuel contains hazardous components such as hydrocarbon (THC), carbon monoxide (CO), and nitrogen oxide (NOx), it is necessary to simultaneously purify and exhaust each of the hazardous components using an oxidation-reduction reaction. For example, it is necessary to purify in such a manner that the hydrocarbon (THC) is converted into water and carbon dioxide by oxidation; the carbon monoxide (CO) is converted into the carbon dioxide by oxidation; and the nitrogen oxide (NOx) is converted into nitrogen by reduction.

As a catalyst (hereinafter, referred to as an "exhaust-gas-purification catalyst") adapted to treat the exhaust gases emitted from such an internal combustion engine, a three way catalysis (TWC) capable of oxidizing and reducing CO, THC, and NOx has been used.

Three way catalysis has been generally used, in which a precious metal is supported on a refractory oxide porous material such as an alumina porous material having a high-specific surface area and the precious metal-supported porous material is supported on a substrate, for example, a monolithic substrate made of a refractory ceramic or metallic honeycomb structure, or on refractory particles. In general, such three way catalysis is attached in the form of a converter in the middle position of an exhaust pipe between an engine and a muffler.

It is important that a ratio of fuel to air (air-fuel ratio, A/F) is controlled to be close to a theoretical air-fuel ratio (stoichiometry) in the three way catalysis. That is, there is a tendency that a purification rate of HC and CO is high in a lean atmosphere in which the air-fuel ratio is larger than the theoretical air-fuel ratio and, conversely, a purification rate of NOx is higher in an excess fuel atmosphere, that is, a rich atmosphere in which the air-fuel ratio is smaller than the theoretical air-fuel ratio. Therefore, in order to obtain a high purification rate in all of three hazardous components, the air-fuel ratio is necessary to be controlled within a narrow range (referred to as a window) close to the theoretical air-fuel ratio (stoichiometry).

Therefore, in order to keep the composition of the exhaust gas to be close to the theoretical air-fuel ratio, a fuel supply is controlled by detecting an oxygen concentration contained in the exhaust gas using an oxygen sensor. Moreover, with respect to a catalyst, in order to absorb variation of the oxygen concentration contained in the exhaust gas and thus to improve exhaust gas purifying performance of the three way catalysis, a co-catalyst (referred to as an "OSC material") having capacity of absorbing the oxygen when the oxygen concentration contained in the exhaust gas is high and of releasing the oxygen when the oxygen concentration contained in the exhaust gas is low, that is, an oxygen storage capacity (OSC) has been used.

As such an OSC material, ceria (cerium oxide, $CeO_2$), a ceria-zirconia complex oxide, or the like is known. A grain growth of ceria in a high-temperature atmosphere facilitates a grain growth of a precious metal existing on the ceria, so that an OSC function of the ceria is decreased. Therefore, an oxide such as zirconia is added about 20% and a ceria-zirconia complex oxide is formed by forming a solid solution with such an oxide, so that it is possible to prevent the grain growth of ceria particles.

However, a pyrochlore-type ceria-zirconia complex oxide is known in addition to a fluorite-type ceria-zirconia complex oxide which is commonly used from the prior art.

Unlike the fluorite-type ceria-zirconia complex oxide, since the pyrochlore-type ceria-zirconia complex oxide is in a state where one of oxygen atoms is deficient and has a structure in which ceria atoms and zirconia atoms are regularly and alternately arranged, it is known to have excellent redox properties of $Ce_2O_3 \Leftrightarrow CeO_2$ due to the change in oxygen concentration. That is, since the valence of Ce atoms contained in the oxide can be changed between a trivalent state and a tetravalent state, the valence of Ce atom is changed into the tetravalent state from the trivalent state to absorb the oxygen in an oxidizing atmosphere where a relatively large amount of $O_2$ is contained and the valence of Ce atom is changed into the trivalent state from the tetravalent state to release the oxygen in a reducing atmosphere where a relatively large amount of CO and HC is contained. Therefore, when the pyrochlore-type oxide is added to the catalyst, variation in exhaust gas composition in the vicinity of catalyst components is reduced and thus the exhaust gas purification described above can more efficiently proceed. In addition, since heat is generated depending on oxygen absorption of the pyrochlore-type oxide, the generated heat can be used in the warm-up of the catalyst at the time of starting an engine, thereby expediting the start timing of catalytic activity. From these viewpoints, the pyrochlore-type oxide is useful as a co-catalyst of the exhaust-gas-purification catalyst.

With respect to such a pyrochlore-type ceria-zirconia complex oxide, the following inventions have been disclosed from the prior art.

For example, Patent Document JP 11-165067 A discloses a method of forming precipitates from a solution containing cerium (III) salt and zirconium (IV) salt using a coprecipitation method and holding the precipitates heated to a temperature of 800 to 1000° C. under an inert atmosphere or a non-oxidizing atmosphere. According to this method, the obtained complex oxide has an X-ray diffraction peak which belongs to a pyrochlore phase and high OSC is exhibited.

Patent Document JP 2005-170774 A discloses a complex oxide composed of $CeO_2$ and $ZrO_2$ that is characterized by having any one or more phases of a pyrochlore phase, κ-phase, or an intermediate phase of these both phases and having a specific surface area of 20 $m^2/g$ or more.

Patent Document WO2008/093471 A discloses a catalyst system to be used in an automobile exhaust gas purification apparatus, comprised of two or more exhaust-gas-purification catalysts including a first catalyst supported on an inorganic structural carrier and a second catalyst other than the first catalyst, characterized in that: the first catalyst is supported on a part of the inorganic structural carrier positioned at the upstream side when being arranged in an exhaust gas passage; on the other hand, the second catalyst is supported on a part of the inorganic structural carrier positioned at the downstream side when being arranged in an exhaust gas passage; and the crystal structure contains a cerium-zirconium complex oxide (A) having a pyrochlore phase.

Patent Document JP 2009-084061 A discloses a ceria-zirconia complex oxide containing complex oxides of ceria and zirconia characterized in that: a regular arrangement phase of a pyrochlore phase type is formed in the complex oxide by cerium ions and zirconium ions; and the regular arrangement phase of the pyrochlore phase type remaining after being heated at a temperature of 1000° C. for five hours in the atmosphere is 50% or more compared to that before the heating.

Patent Document JP 2012-110859 A discloses an exhaust-gas-purification catalyst formed by coating a honeycomb substrate with a catalyst layer, wherein, in the cross section vertical to the exhaust gas flow, the exhaust-gas-purification catalyst is formed by: coating a catalyst layer having a slow oxygen absorbing/releasing rate and containing an OSC material such as a ceria-zirconia complex oxide, which is formed with a regular arrangement phase of a pyrochlore phase type, on a center portion of the cross section; and coating a catalyst layer having a fast oxygen absorbing/releasing rate and containing an OSC material such as a general ceria-zirconia complex oxide on an outer periphery of the cross section.

The pyrochlore-type oxide was generally produced in such a manner that a mixture of cerium oxide and zirconium oxide is subjected to calcining, thereby producing a complex oxide $CeZrO_4$, and then the complex oxide is subjected to reducing treatment to remove the oxygen.

As a method invention of producing a pyrochlore type oxide, for example, Patent Document JP 2003-246624 A discloses a method of producing a pyrochlore type oxide characterized in that: a mixed solution of a cerium compound, a zirconium compound, and a precious metal compound is prepared; after a reducing agent is added to the mixed solution, a solid substance containing cerium, zirconium, and a precious metal is prepared from the mixed solution; and then the solid substance is calcined in a non-oxidizing atmosphere.

In addition, Patent Document JP 2005-170774 A discloses a method of producing a complex oxide of $CeO_2$ and $ZrO_2$ characterized in that: an aqueous solution of a cerium compound and a zirconium compound and a precipitant aqueous solution are mixed with each other, thereby generating precipitates; and the generated precipitates is mixed with water and solvent forming an azeotropic mixture and is subjected to azeotropic dehydration treatment and then is calcined in a reducing atmosphere, thereby producing the oxide.

SUMMARY OF THE INVENTION

With respect to the exhaust-gas-purification catalyst carrier that contains the ceria-zirconia complex oxide having the pyrochlore phase, it was difficult to exhibit excellent OSC performance at any temperature region of a low temperature (around 400° C.) and a high temperature (around 800° C.).

Here, the invention relates to an exhaust-gas-purification catalyst carrier that contains a ceria-zirconia complex oxide having a pyrochlore phase and is to provide a novel exhaust-gas-purification catalyst carrier that can exhibit excellent OSC performance at any temperature region of a low temperature (around 400° C.) and a high temperature (around 800° C.).

The invention provides an exhaust-gas-purification catalyst carrier containing a ceria-zirconia complex oxide which has a pyrochlore phase and is 7.0 $m^2/g$ or more in specific surface area and in the range of 100 Å to 700 Å in crystallite size.

The exhaust-gas-purification catalyst carrier according to the invention relates to a ceria-zirconia complex oxide that has a pyrochlore phase and is prepared to have a surface area of 7.0 $m^2/g$ or more and a crystallite size of the range of 100 Å to 700 Å, so that excellent OSC performance can be exhibited at any temperature region of a low temperature (around 400° C.) and a high temperature (around 800° C.).

BRIEF DESCRIPTION OF THE DRAWING

The drawing is a graph in which log differential pore volume distributions of samples obtained in Example 1 and Comparative Example 1 are illustrated in coordinates having a horizontal axis represented by a pore size and a vertical axis represented by a log differential pore volume value.

DETAILED DESCRIPTION OF THE INVENTION

Next, the invention will be described based on an example of an embodiment (referred to as "the present embodiment") of the invention. However, the invention is not intended to be limited to the present embodiment described below.

<Present Catalyst Carrier>

An exhaust-gas-purification catalyst carrier (referred to as a "present catalyst carrier") according to the present embodiment is an exhaust-gas-purification catalyst carrier containing a ceria-zirconia complex oxide (referred to as a "present ceria-zirconia complex oxide") having a pyrochlore phase.

The present ceria-zirconia complex oxide may be formed in a single phase of the pyrochlore phase or may be formed in another phase, for example, a mixed phase including a fluorite phase.

Whether or not the present ceria-zirconia complex oxide has the pyrochlore phase can be determined by deciding whether a peak existing in the vicinity of $2\theta=14.8°$ in a diffraction pattern of an XRD (X-ray diffraction) has the intensity of $\frac{1}{30}$ or more with respect to a main peak existing in the vicinity of $2\theta=29.3°$.

Here, the "main peak" represents a peak of the maximum intensity.

In the present ceria-zirconia complex oxide, a peak intensity ratio (Ip/Im) of a peak Ip indicating a pyrochlore structure existing in the range of $2\theta=13.7$ to $15.3°$ to a main peak Im existing in the range of $2\theta=28.8$ to $29.8°$ in the diffraction pattern of the XRD (X-ray diffraction) is preferably 0.03 or more.

In the present ceria-zirconia complex oxide, when the peak intensity ratio (Ip/Im) is 0.03 or more, it can be confirmed that the pyrochlore phase preferably exists.

In the present ceria-zirconia complex oxide, it is important that the specific surface area is 7.0 $m^2/g$ or more and the crystallite size is 100 Å to 700 Å.

As seen in Examples to be described below, it is hard to say that the ceria-zirconia complex oxide only having the pyrochlore phase has excellent OSC performance compared to a conventional ceria-zirconia complex oxide at any temperature region of a low temperature (around 400° C.) and a high temperature (around 800° C.). In contrast, since the OSC at the low-temperature region (around 400° C.) is exhibited with a high effect when the specific surface area is 7.0 m²/g or more and the OSC at the high-temperature region (around 800° C.) is exhibited with a high effect when the crystallite size is 100 to 700 Å, it was found that excellent OSC performance could be obtained from the low-temperature region to the high-temperature region when both conditions were satisfied.

From these viewpoints, the specific surface area of the present ceria-zirconia complex oxide is more preferably 10.0 m²/g or more. However, when the specific surface area is too high, it is difficult to make the crystallite size large. Therefore, the specific surface area is preferably 30.0 m²/g or less, more preferably 25.0 m²/g or less, and most preferably 20.0 m²/g or less.

In addition, from the same viewpoints, the crystallite size of the present ceria-zirconia complex oxide is more preferably 100 Å or larger or 700 Å or smaller and most preferably 200 Å or larger or 600 Å or smaller.

Here, "crystallite" means the maximum agglomeration regarded as a single crystal, and it can be measured by XRD and calculated according to Scherrer's equation as described below in Example.

In the present ceria-zirconia complex oxide, further, a value of crystallite size (Å)×specific surface area (m²/g) is 800 to 3000 (Å·m²/g).

When the value of crystallite size (Å)×specific surface area (m²/g) is 800 (Å·m²/g) or larger, the OSC performance is more excellent from the low temperature to the high temperature, which is preferable.

From such a viewpoint, in the present ceria-zirconia complex oxide, the value of crystallite size (Å)×specific surface area (m²/g) is particularly preferably 1000 (Å·m²/g) or larger or 2800 (Å·m²/g) or smaller.

In the present ceria-zirconia complex oxide, as will be described below, the specific surface area and the crystallite size can be adjusted by changing reducing conditions (in particular, reducing strength), calcining conditions (in particular, calcining temperature and calcining time), dehydration conditions, neutralizing conditions or the like.

In the present ceria-zirconia complex oxide, the peak preferably exists in the range of a pore size of 100 nm or smaller in the log differential pore volume distribution measured by a mercury intrusion porosimeter, more preferably exists in the range of 10 nm or larger or 70 nm or smaller (the value of this pore size is referred to as a "pore size peak value"), and most preferably exists in the range of the 20 nm or larger or 50 nm or smaller.

Here, the "peak" means a peak having a log differential pore volume value of 0.05 mL/g or more with respect to the pore size of 100 nm or smaller when the log differential pore volume distribution is plotted in coordinates having a horizontal axis represented by the pore size and a vertical axis represented by the log differential pore volume value. In other words, a peak having a log differential pore volume value below 0.05 mL/g means to be excluded from the "peak" described here.

In order for the peak to exist in the range of the pore size of 100 nm or smaller, the present ceria-zirconia complex oxide is preferably prepared by a wet method to be described below.

The present catalyst carrier may contain, for example, a transition metal such as Cu, Mn, Fe, Co, Ni, or Y, a typical element such as Al, Zn, In, Sn, or Sb, and a rare earth element such as La, Pr, Nd, Sm, or Gd, in addition to the present ceria-zirconia complex oxide.

<Method of Producing the Present Catalyst Carrier>

An example of a method of producing the present catalyst carrier will be described below. However, the method of producing the present catalyst carrier is not limited to the following producing method.

As the method of producing the present catalyst carrier, an alkaline solution is prepared, an aqueous solution of a cerium compound and a zirconium compound is slowly added to the alkaline solution to be neutralized, and the neutralized solution is oxidized by adding hydrogen peroxide while heating, thereby generating a precipitate. Then, the generated precipitate is subjected to filtering, washing, and drying after aging and then is calcined at a high temperature of 800 to 1200° C. under a reducing atmosphere, so that the present catalyst carrier can be produced.

At this time, in order to produce the present catalyst carrier, it is important to slowly neutralize, to sufficiently perform the aging, to increase reducing strength of a calcining atmosphere, and to perform the calcining at the high temperature of 900 to 1100° C.

As the alkaline solution, for example, ammonia water or an aqueous solution of an alkali metal such as sodium hydroxide can be used.

As the cerium compound, for example, a water-soluble compound such as a nitrate, a sulphate, or a chloride which is referred to as cerium nitrate or cerium chloride can be used.

As the zirconium compound, for example, a water-soluble compound such as a nitrate, a sulphate, or a chloride which is referred to as zirconium oxynitrate or zirconium oxychloride.

In neutralization, preferably, the aqueous solution of the cerium compound and the zirconium compound is slowly added to the alkaline solution to be neutralized. At this time, an adding speed is preferably about 10 mL/min to 3000 mL/min and more preferably 15 mL/min or higher or 2000 mL/min or lower.

The calcining atmosphere is preferably an atmosphere in which reducing gas such as $H_2$ or CO is contained. In this case, the atmosphere is preferably 0.1% or more $H_2/N_2$ reducing atmosphere to increase the reducing strength from the viewpoint of exhibiting the OSC performance and is preferably 4% or less $H_2/N_2$ reducing atmosphere from the viewpoint of handling.

The calcining temperature is preferably 800 to 1200° C.

<Application of the Present Catalyst Carrier>

An example of an application of the present catalyst carrier will be described below. However, the application of the present catalyst carrier is not limited to the following application.

For example, the present catalyst carrier can be used to produce an exhaust gas purifying catalyst including a structure formed by supporting a catalyst active component such as Pd thereon. For example, a three way catalysis can be produced in such a manner that the present catalyst carrier, a precious metal such as Pd, an inorganic porous material such as alumina as needed, a binder, and a catalyst layer containing a stabilizer such as a barium hydroxide are formed on a surface of a substrate having a honeycomb structure.

For example, such a catalyst can be produced in such a manner that the catalyst layer is formed on the surface of the substrate through the processes of obtaining a slurry by mixing and stirring the present catalyst carrier, the catalyst active component, the inorganic porous material, the stabilizer, the binder, and water and coating the obtained slurry to the substrate such as a ceramic honeycomb material by a wash coat and performing the calcining on the slurry-coated substrate.

Examples of materials of the substrate described above may include refractory materials such as ceramics and metal materials. Examples of material of the ceramic substrate may include a refractory ceramic material, for example, cordierite, cordierite-alpha alumina, silicon nitride, zircon mullite, spodumene, alumina-silica magnesia, zircon silicate, sillimanite, magnesium silicate, petalite, alpha alumina, alumino-silicates, and the like. Examples of materials of the metal substrate may include a refractory metal, for example, other suitable corrosion-resistant alloys based on stainless steel or iron.

The shape of the substrate may include a honeycomb shape, a pellet shape, or a spherical shape.

The honeycomb material may use, for example, a cordierite material such as the ceramics. In addition, the honeycomb material may use the honeycomb formed of a metal material such as ferritic stainless steel.

In a case of using the substrate of the honeycomb shape, for example, it is possible to use a monolithic substrate which has a plurality of minute gas flow passages, that is, channels parallel to each other inside the substrate so that fluid flows through the inside of the substrate. At this time, catalyst compositions may be coated on the inner wall surface of each channel of the monolithic substrate by the wash coat, thereby forming the catalyst layer.

An example of the catalyst active component may include metals such as palladium, platinum, rhodium, gold, silver, ruthenium, iridium, nickel, cerium, cobalt, copper, osmium, strontium. The catalyst active component preferably includes palladium and, in addition to Pd, other precious metals, for example, Rh, Pt or the like may be supported on the catalyst active component as needed.

Examples of the inorganic porous material may include a porous material of the compound selected from a group consisting of silica, alumina, and titania compounds, for example, a porous material consisting of the compound selected from alumina, silica, silica-alumina, alumino-silicates, alumina-zirconia, alumina-chromia, and alumina-ceria.

Examples of the stabilizer may include an alkaline-earth metal or an alkaline metal. Preferably, the stabilizer can be selected from one or two or more of metals selected from a group consisting of magnesium, barium, boron, thorium, hafnium, silicon, calcium, and strontium. Among them, barium is preferred in terms that a reduction temperature of PdOx is highest, that is, the reduction is not likely to occur.

The binder component may use inorganic binder, for example, an aqueous solution such as an alumina sol.

<Explanation of Expressions>

In this specification, when the expression "X to Y" (X and Y are arbitrary numbers) is used, unless otherwise explicitly mentioned, the meaning of "X or greater but Y or lower" is included and at the same time, the meaning of "preferably greater than X" or "preferably less than Y" is included.

In addition, the expression "X or greater" (X is arbitrary number) or "Y or less" (Y is arbitrary number) includes the intention of "it is preferable to be greater than X" or "it is preferable to be less than Y".

EXAMPLES

Hereinafter, the invention will be described in detail based on following Examples and Comparative Examples.

Example 1

After an aqueous solution (metal concentration: 0.68 mol/L) of 500 mL obtained by dissolving cerium nitrate and zirconium nitrate was slowly added to ammonia water (3.6% $NH_3$) of 2000 g heated to 40° C. at a rate of 20 ml/minute and then was stirred for one hour, 0.35 mol/L hydrogen peroxide of 500 mL was additionally added while heating to 80° C. and then was stirred for two hours, thereby generating a precipitate. Thereafter, the obtained precipitate was allowed to stand still over night for aging, was subjected to filtering, washing, and drying by heating to 60° C. under atmospheric conditions, and then was subjected to calcining at 1000° C. for five hours under the reducing atmosphere (0.3% $H_2/N_2$), resulting in producing a ceria-zirconia complex oxide (sample).

The obtained sample was subjected to X-ray diffraction (X-ray source: CuKα1, tube current: 100 mA, and tube voltage: 40 kV) using an XRD analyzer ("RINT-TTRIII" manufactured by Rigaku Corporation). As a test result, it was confirmed from the obtained diffraction pattern that a peak exists in the range of 2θ=14.8° and the intensity of the peak is 1/30 or more compared to a main peak existing in the vicinity of 2θ=29.3°, so that the sample has a pyrochlore phase.

Example 2

A ceria-zirconia-complex oxide (sample) was produced in the same manner as in Example 1, except that the calcining atmosphere was set to be 0.5% $H_2/N_2$ and the calcining temperature was set to be 1100° C.

The obtained sample was subjected to X-ray diffraction (X-ray source: CuKα1, tube current: 100 mA, and tube voltage: 40 kV) using an XRD analyzer ("RINT-TTRIII" manufactured by Rigaku Corporation). As a test result, it was confirmed from the obtained diffraction pattern that a peak exists in the range of 2θ=14.8° and the intensity of the peak is 1/30 or more compared to a main peak existing in the vicinity of 2θ=29.3°, so that the sample has a pyrochlore phase.

Example 3

A ceria-zirconia-complex oxide (sample) was produced in the same manner as in Example 1, except that the calcining atmosphere was set to be 2.0% $H_2/N_2$ and the calcining temperature was set to be 900° C.

The obtained sample was subjected to X-ray diffraction (X-ray source: CuKα1, tube current: 100 mA, and tube voltage: 40 kV) using an XRD analyzer ("RINT-TTRIII" manufactured by Rigaku Corporation). As a test result, it was confirmed from the obtained diffraction pattern that a peak exists in the range of 2θ=14.8° and the intensity of the peak is 1/30 or more compared to a main peak existing in the vicinity of 2θ=29.3°, so that the sample has a pyrochlore phase.

Example 4

A ceria-zirconia complex oxide (sample) was produced in the same manner as in Example 1, except that the calcining atmosphere was set to be 1.2% $H_2/N_2$, the calcining temperature was set to be 1000° C., and the calcining time was set to be 10 hours.

The obtained sample was subjected to X-ray diffraction (X-ray source: CuKα1, tube current: 100 mA, and tube voltage: 40 kV) using an XRD analyzer ("RINT-TTRIII" manufactured by Rigaku Corporation). As a test result, it was confirmed from the obtained diffraction pattern that a peak exists in the range of 2θ=14.8° and the intensity of the peak is 1/30 or more compared to a main peak existing in the vicinity of 2θ=29.3°, so that the sample has a pyrochlore phase.

Comparative Example 1

A commercially available ceria-zirconia complex oxide (sample) produced by a melting method was used.

The obtained sample was subjected to X-ray diffraction (X-ray source: CuKα1, tube current: 100 mA, and tube voltage: 40 kV) using an XRD analyzer ("RINT-TTRIII" manufactured by Rigaku Corporation). As a test result, it was confirmed from the obtained diffraction pattern that a peak exists in the range of 2θ=14.8° and the intensity of the peak is 1/30 or more compared to a main peak existing in the vicinity of 2θ=29.3°, so that the sample has a pyrochlore phase.

Comparative Example 2

A ceria-zirconia complex oxide (sample) was produced in the same manner as in Example 1, except that the calcining atmosphere was set to be in the air.

The obtained sample was subjected to X-ray diffraction (X-ray source: CuKα1, tube current: 100 mA, and tube voltage: 40 kV) using an XRD analyzer ("RINT-TTRIII" manufactured by Rigaku Corporation). As a test result, it was confirmed from the obtained diffraction pattern that a peak exists in the range of 2θ=14.8°, whereas the intensity of the peak is less than 1/30 compared to a main peak existing in the vicinity of 2θ=29.3°, so that the sample does not have a pyrochlore phase.

<Measurement of Crystallite Size>

With respect to the samples (powder) obtained in Examples and Comparative Examples, a crystallite size was measured.

Using Scherrer's equation, the crystallite size was calculated from a half-width of the main peak appearing in the vicinity (28.8 to 29.8°) of the range of 2θ=29.3° due to (111) plane of the X-ray diffraction pattern (XRD pattern) obtained by performing the X-ray diffraction using the XRD analyzer ("RINT-TTRIII" manufactured by Rigaku Corporation) under the following conditions; X-ray source: CuKα1, tube current: 100 mA, and tube voltage: 40 kV.

$$D=\lambda/\beta \cos \theta$$

(where, λ, β, and θ represent an X-ray wavelength, a half-width, and a reflection angle, respectively.)

The X-ray (CuKα ray) wavelength λ used in this measurement is 1.541 Å. In addition, the reflection angle θ was calculate using 2θ due to the measured (111) plane.

<Measurement of BET Specific Surface Area>

A BET specific surface area of the samples (powders) obtained in Examples and Comparative Examples was measured by an $N_2$ gas absorption method using a specific surface area/pore distribution measuring apparatus ("SA3100" manufactured by Beckman Coulter, Inc.).

<Measurement of Pore Distribution>

A measurement method of a log differential pore volume distribution is performed in such a manner that a pressure applied to mercury is changed and the amount of the mercury penetrated into pores at the time of changing the pressure is measured, resulting in measuring the pore (void) distribution.

The conditions in which the mercury may penetrate into the pores may be represented by the following expression: PD=−4σ COS θ from the balance of force, provided that the pressure, the pore size, the contact angle of the mercury, and the surface tension of the mercury are defined as P, D, θ, and σ, respectively. At this time, if the contact angle and the surface tension are defined as a constant number, the pressure P and the size D of the pores into which mercury may penetrate are inversely proportional. Thus, the pressure P and the volume V of mercury penetrated at the pressure P are measured by changing the pressure, and the horizontal axis P of the obtained P-V curve is replaced with the pore size from the expression without change, resulting in obtaining the pore distribution.

The measurement may be carried out using a measurement apparatus such as an automatic porosimeter "Autopore IV-9520" manufactured by Shimadzu Corporation under the following conditions and procedures.

(Measurement Conditions)

Measurement environment: 25° C.

Measurement cell: Sample-chamber volume 3 cm$^3$, Intrusion volume 0.39 cm$^3$

Measurement range: from 0.0048 MPa to 255.106 MPa

Measurement points: 131 points (points are divided to be at equal intervals when the pore size is represented by a logarithm)

Intrusion volume: Adjusted to be 25% or more and 80% or less.

(Low Pressure Parameter)

Exhaust pressure: 50 μmHg

Exhaust time: 5.0 min

Mercury intrusion pressure: 0.0034 MPa

Equilibration time: 10 sec (High pressure parameter)

Equilibration time: 10 sec (Mercury Parameter)

Forward contact angle: 130.0 degrees

Backward contact angle: 130.0 degrees

Surface tension: 485.0 mN/m (485.0 dynes/cm)

Mercury density: 13.5335 g/mL (Measurement Procedures)

(1) Weighing approximately 0.60 g the samples (powders) obtained in Examples and Comparative Examples to measure.

(2) At a low pressure, measuring 46 points in the range of 0.0048 MPa or more and 0.2068 MPa or less.

(3) At a high pressure, measuring 85 points in the range of 0.2241 MPa or more and 255.1060 MPa or less.

(4) Calculating pore size distribution from the mercury intrusion pressure and the mercury intrusion amount and calculating the peak value (nm) of the pore size existing in the range of 100 nm or smaller.

The above procedures (2), (3), and (4) were automatically carried out by software attached to the apparatus.

<Evaluation Test of OSC>

Using a fully automatic chemical absorption analysis apparatus "AutoChemII2920" manufactured by Shimadzu Corporation, the samples (powders) obtained in Examples and Comparative Examples were subjected to pre-treatment in which the temperature was raised to 800° C. under the flowing of He gas and then was kept for 30 minutes, and thereafter was lowered to 200° C. Then, the sample was subjected to three-time pulse application of $O_2$ while being kept at 200° C. and then was reduced by twenty-time pulse application of 10% CO/He. Thereafter, the sample was subjected to four-time pulse application of $O_2$, resulting in obtaining the relation of $O_2$ absorbing amount=OSC.

Then, the sample was subjected to three-time pulse application of $O_2$ and then was reduced by twenty-time pulse application of 10% CO/He as described above, resulting in measuring the OSC in each temperature of 400° C., 600° C., and 800° C. under the flowing of He.

In Table 1, the OSC measured in each temperature is indicated as a relative value when the OSC obtained in Comparative Example 1 was set to be 100.00.

TABLE 1

| | BET | Crystallite | OSC | | | Peak value (nm) of pore size existing in rage of 100 nm | Peak intensity ratio | BET × crystallite size |
|---|---|---|---|---|---|---|---|---|
| | $m^2/g$ | size Å | 400° C. | 600° C. | 800° C. | or smaller | Ip/Im | Å · $m^2/g$ |
| Comparative Example 1 | 0.50 | >1000 | 100.00 | 100.00 | 100.00 | — | 0.35 | — |
| Comparative Example 2 | 8.55 | 93 | 96.76 | 123.60 | 67.96 | 23 | 0.01 | 795.15 |
| Example 1 | 11.78 | 213 | 496.88 | 253.90 | 106.27 | 26 | 0.04 | 2509.14 |
| Example 2 | 8.56 | 234 | 425.88 | 268.18 | 111.62 | 34 | 0.10 | 2003.04 |
| Example 3 | 12.17 | 202 | 646.62 | 266.21 | 109.93 | 26 | 0.05 | 2458.34 |
| Example 4 | 7.01 | 277 | 370.48 | 276.39 | 117.23 | 40 | 0.06 | 1941.77 |

In Comparative Example 1, since the peak did not exist in the range of the pore size of 100 nm or smaller, the column of the peak value of the pore size was represented as a symbol "-". Furthermore, in Comparative Example 1, since the crystallite size was too large and thus could not be accurately measured, the crystallite size was indicated as ">1000" and the column of BET×crystallite was represented as a symbol "-".

Example 5

The ceria-zirconia complex oxide (powder) of 9.9 g obtained in Example 1 was mixed with an aqueous Pd nitrate solution (Pd concentration: 0.25 wt %) of 40.0 g and then was stirred with each other for one hour. Thereafter, the resultant was heated to remove water and was subjected to evaporation to dryness, thereby obtaining a solid substance. After the obtained solid substance was crushed, it was subjected to heat treatment at 600° C. for one hour under atmospheric conditions, resulting in obtaining a Pd-supported ceria-zirconia complex oxide.

The evaluation test of OSC was performed on the Pd-supported ceria-zirconia complex oxide thus obtained, in the same manner as in Example 1, and, as a result of the test, it was found that the OSC values were 1522.68 and 250.86 at 400° C. and 600° C., respectively as a relative value when the value in Comparative Example 1 was set to be 100.00 and the OSC performance was significantly improved at the low temperature (400° C.).

SUMMARY

From Examples, Comparative Examples, and the test results which have been performed till now by the inventors, it is hard to say that the ceria-zirconia complex oxide only having the pyrochlore phase as in the Comparative Examples has excellent OSC performance compared to the conventional ceria-zirconia complex oxide at any temperature region of the low temperature (around 400° C.) and the high temperature (around 800° C.). In contrast, as seen in Examples, when the specific surface area is 7 to 20 $m^2/g$ and the crystallite size is 200 to 700 Å, it was found that the ceria-zirconia complex oxide had excellent OSC performance compared to the conventional ceria-zirconia complex oxide at any temperature region of the low temperature (around 400° C.) and the high temperature (around 800° C.).

In addition, as in Examples, it was also found that the specific surface area and the crystallite size could be adjusted by changing the reducing conditions (in particular, reducing strength), the calcining conditions (in particular, calcining temperature and calcining time), the dehydration conditions, or the neutralizing conditions.

The invention claimed is:

1. An exhaust-gas-purification catalyst having a structure formed by supporting at least Pd as a precious metal on an exhaust-gas-purification catalyst carrier comprising a ceria-zirconia complex oxide which has a pyrochlore phase and is 7.0 $m^2/g$ or more and 12.17 $m^2/g$ or less in specific surface area and in the range of 202 Å to 700 Å in crystallite size.

2. The exhaust-gas-purification catalyst according to claim 1, wherein a peak exists in the range of a pore size of 100 nm or smaller in a log differential pore volume distribution measured by a mercury intrusion porosimeter in the exhaust-gas-purification catalyst carrier.

3. The exhaust-gas-purification catalyst according to claim 1, wherein a value of crystallite size (Å)×specific surface area ($m^2/g$) is in the range of 1414 to 3000 (Å·$m^2/g$) in the exhaust-gas-purification catalyst carrier.

4. The exhaust-gas-purification catalyst according to claim 1, wherein a peak intensity ratio (Ip/Im) of a peak Ip indicating a pyrochlore structure existing in the range of $2\theta=13.7$ to $15.3°$ to a main peak Im existing in the range of $2\theta=28.8$ to $29.8°$ is 0.03 or more in a diffraction pattern of XRD (X-ray diffraction) in the exhaust-gas-purification catalyst carrier.

5. The exhaust-gas-purification catalyst according to claim 2, wherein a value of crystallite size (Å)×specific surface area ($m^2/g$) is in the range of 1414 to 3000 (Å·$m^2/g$) in the exhaust-gas-purification catalyst carrier.

6. The exhaust-gas-purification catalyst according to claim 2, wherein a peak intensity ratio (Ip/Im) of a peak Ip indicating a pyrochlore structure existing in the range of $2\theta=13.7$ to $15.3°$ to a main peak Im existing in the range of $2\theta=28.8$ to $29.8°$ is 0.03 or more in a diffraction pattern of XRD (X-ray diffraction) in the exhaust-gas-purification catalyst carrier.

7. The exhaust-gas-purification catalyst according to claim 3, wherein a peak intensity ratio (Ip/Im) of a peak Ip indicating a pyrochlore structure existing in the range of $2\theta=13.7$ to $15.3°$ to a main peak Im existing in the range of $2\theta=28.8$ to $29.8°$ is 0.03 or more in a diffraction pattern of XRD (X-ray diffraction) in the exhaust-gas-purification catalyst carrier.

\* \* \* \* \*